United States Patent
Nagata

(10) Patent No.: US 6,921,167 B2
(45) Date of Patent: Jul. 26, 2005

(54) EYEGLASS FRAMES FOR MOUNTING MAGNIFYING LENSES AND MAGNIFYING LENSES USING EYEGLASS FRAMES

(75) Inventor: Yoshio Nagata, Tokyo (JP)

(73) Assignee: Kabushikikaisha Keller & Y. NA., Tokyo (JP)

( * ) Notice: Subject to any disclaimer, the term of this patent is extended or adjusted under 35 U.S.C. 154(b) by 0 days.

(21) Appl. No.: 10/621,314

(22) Filed: Jul. 18, 2003

(65) Prior Publication Data

US 2004/0017539 A1 Jan. 29, 2004

(30) Foreign Application Priority Data

Jul. 19, 2002 (JP) ....................................... 2002-211064
Oct. 18, 2002 (JP) ....................................... 2002-304175

(51) Int. Cl.[7] ................................................ G02C 1/00
(52) U.S. Cl. ...................................................... 351/158
(58) Field of Search ................... 351/41, 158; 359/409, 359/410, 412, 411

(56) References Cited

U.S. PATENT DOCUMENTS

| 4,364,645 | A | * | 12/1982 | Feinbloom | 351/204 |
| 4,863,458 | A | * | 9/1989 | Bokros | 623/2.26 |
| 5,090,796 | A | * | 2/1992 | Feinbloom | 351/158 |
| 6,667,833 | B1 | * | 12/2003 | Fay | 359/411 |

FOREIGN PATENT DOCUMENTS

| JP | 55-52122 | 4/1980 |
| JP | 55-116314 | 8/1980 |

* cited by examiner

*Primary Examiner*—Huy Mai
(74) *Attorney, Agent, or Firm*—Wenderoth, Lind & Ponack, L.L.P.

(57) ABSTRACT

Eyeglass frames for mounting magnifying lenses according to the present invention comprise support units each having an engagement space, and each being positioned on inner sides of each lens frame to match each eye of a wearer. A magnifying lens system is incorporated in the engagement space, and a pair of magnifying main units having an ocular tube is engaged in the ocular tube and is removably mounted on a support unit, which is engaged at the ocular tube and engaged by a fixing mechanism.

19 Claims, 5 Drawing Sheets

US 6,921,167 B2

EYEGLASS FRAMES FOR MOUNTING MAGNIFYING LENSES AND MAGNIFYING LENSES USING EYEGLASS FRAMES

BACKGROUND OF THE INVENTION

The present invention relates to eyeglass frames for mounting various types of magnifying lenses including magnifying lenses for medical treatment to be used in surgical operations by surgeons. The invention also relates to magnifying lenses using such eyeglass frames (i.e., magnifying eyewear).

In the past, as a mechanism for mounting magnifying lenses for the applications such as medical use by utilizing eyeglasses, a mechanism using lenses has been known. More concretely, a pair of magnifying lens main units is inserted in a circular engagement hole arranged at a predetermined position on the eyeglass lenses and immovably fixed on the lens around the engagement hole so that the distance between optical axes of the magnifying lens system of each of the magnifying lens main unit is consistent with the distance between the two eyes of the wearer, and so that these optical axes cross each other at the focal point (e.g. Japanese Utility Model Publication Laid-open No. 52122/1980).

However, special technique is required to form an engagement hole suitable for the magnifying lens main unit in the conventional type magnifying lens, and it has not been possible to fabricate such magnifying lens at an optical shop. Also, because the ocular side of the magnifying lens main unit is immovably fixed on a circular engagement hole on the eyeglass lens, it has not been possible to perform adjustment for eye-to-eye distance (i.e., adjustment of the position of the magnifying lens main unit so that optical axes of the magnifying lens system of the magnifying lens main unit are aligned with the positions of pupils of the user after fixation). For this reason, each user must have the magnifying lenses manufactured on a custom-made basis to suit the eye-to-eye distance or visual acuity of each user. This means that such magnifying lenses are not suitable for general-purpose application and must be produced at high cost.

SUMMARY OF THE INVENTION

It is an object of the present invention to provide eyeglass frames for mounting magnifying lenses and magnifying lenses using such eyeglass frames (magnifying eyewear).

To overcome the above disadvantages, it is a first object of the present invention to make it possible to mount the magnifying lens main unit much easier and to removably mount it. It is a second object of the present invention to adjust the mounting position of the magnifying lens main unit to suit the positions of the pupils of each wearer.

To attain the first object of the present invention, a support unit is provided so that magnifying lenses are removably mounted on eyeglass frames.

Further, to attain the second object of the invention, a support unit is provided for displaceably supporting a magnifying lens main unit on the eyeglass frames.

In general, it is known that human eyes have a tolerance range where the focal point can be adjusted even when the focal points of lens systems are not perfectly consistent with each other. Through the results of experiments, the present inventors have found that the wearer can adjust the focal point and can see an object because of the function inherent to the wearer when a magnifying lens system of the magnifying lens main unit is moved along a flat plane, and not along a curved surface, which has its center at the focal point of the magnifying lens system and includes an arc, which has the focal length as radius. As a result, to attain the second object of the present invention, it is preferable that the support unit is curved to match and follow a curved surface including an arc, which has the focal length as radius, and having its center at the focal point of the magnifying lens system in order that the optical axes of the magnifying lens system of left and right magnifying lens main units cross each other at the focal point, while the magnifying lens main units may be directed in a horizontal direction.

DETAILED DESCRIPTION OF THE PREFERRED EMBODIMENTS

Figure 1:
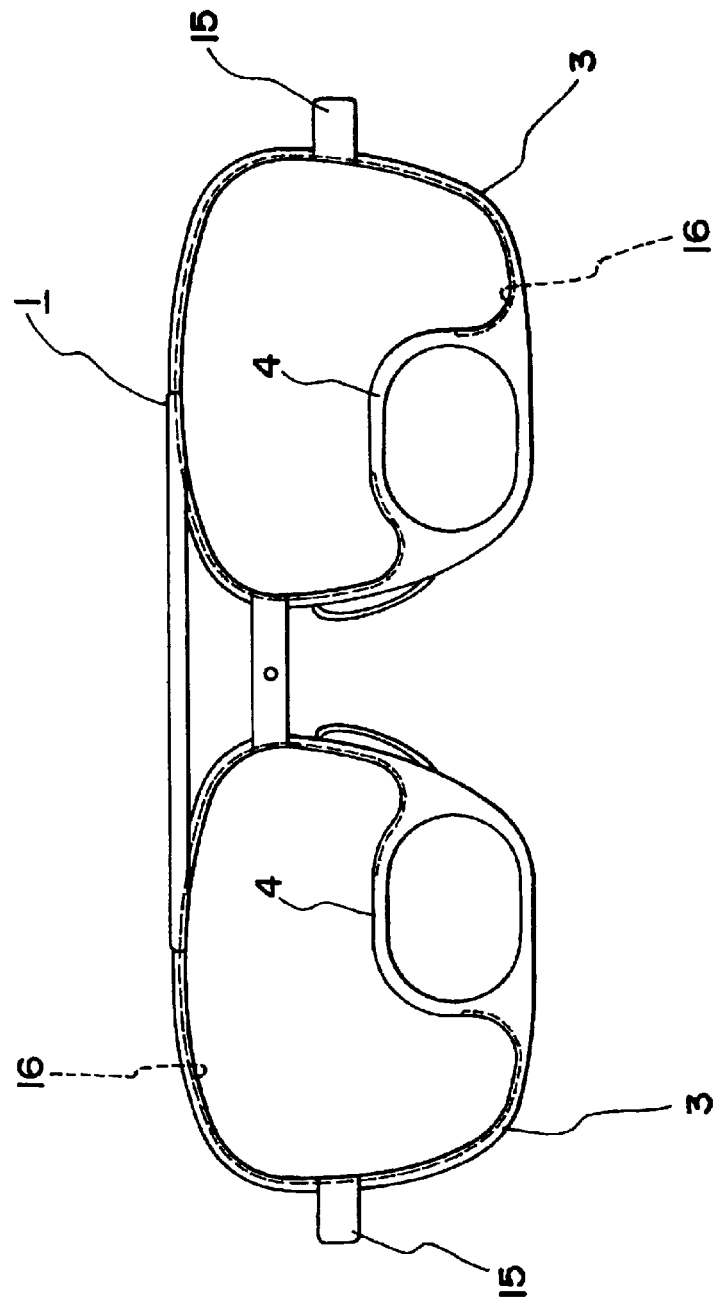
FIG. 1 is a front view of eyeglass frames for mounting magnifying lenses.
Figure 2:
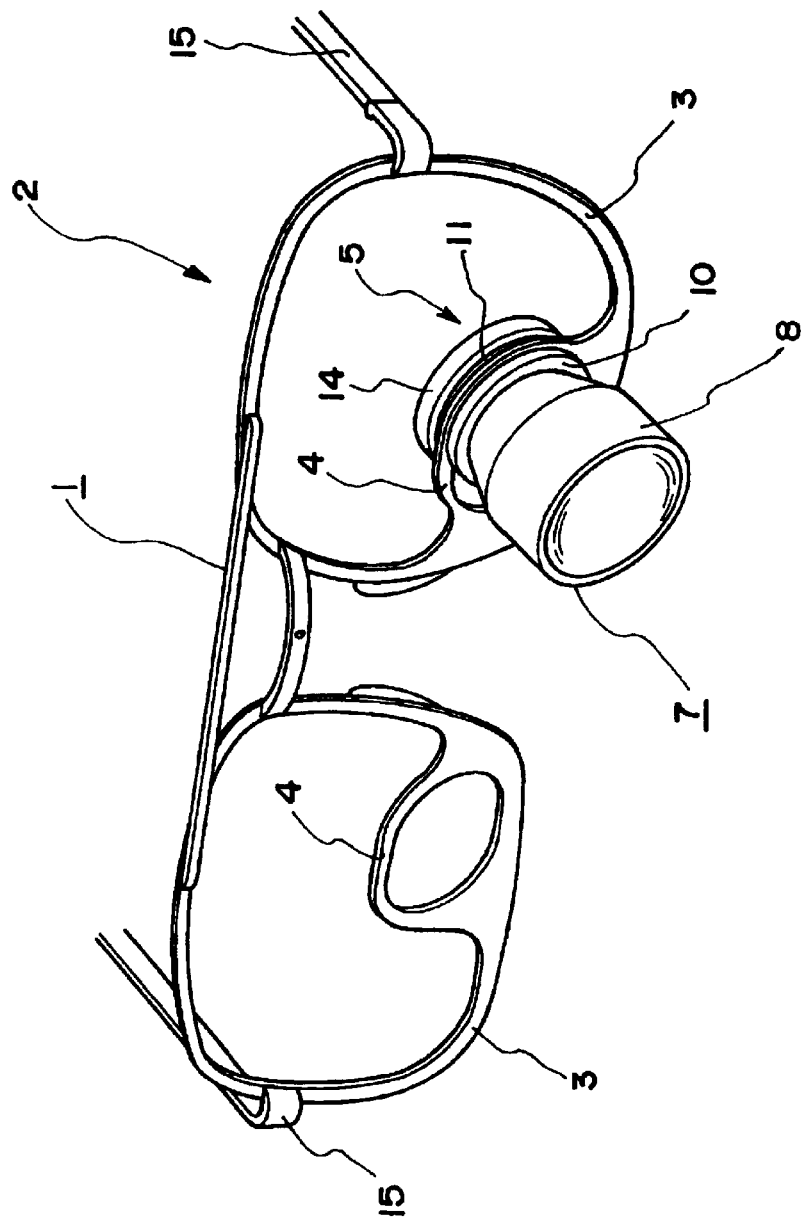
FIG. 2 is a perspective view of a magnifying lens with one of the magnifying lenses removed from the eyeglass frames.
Figure 3:
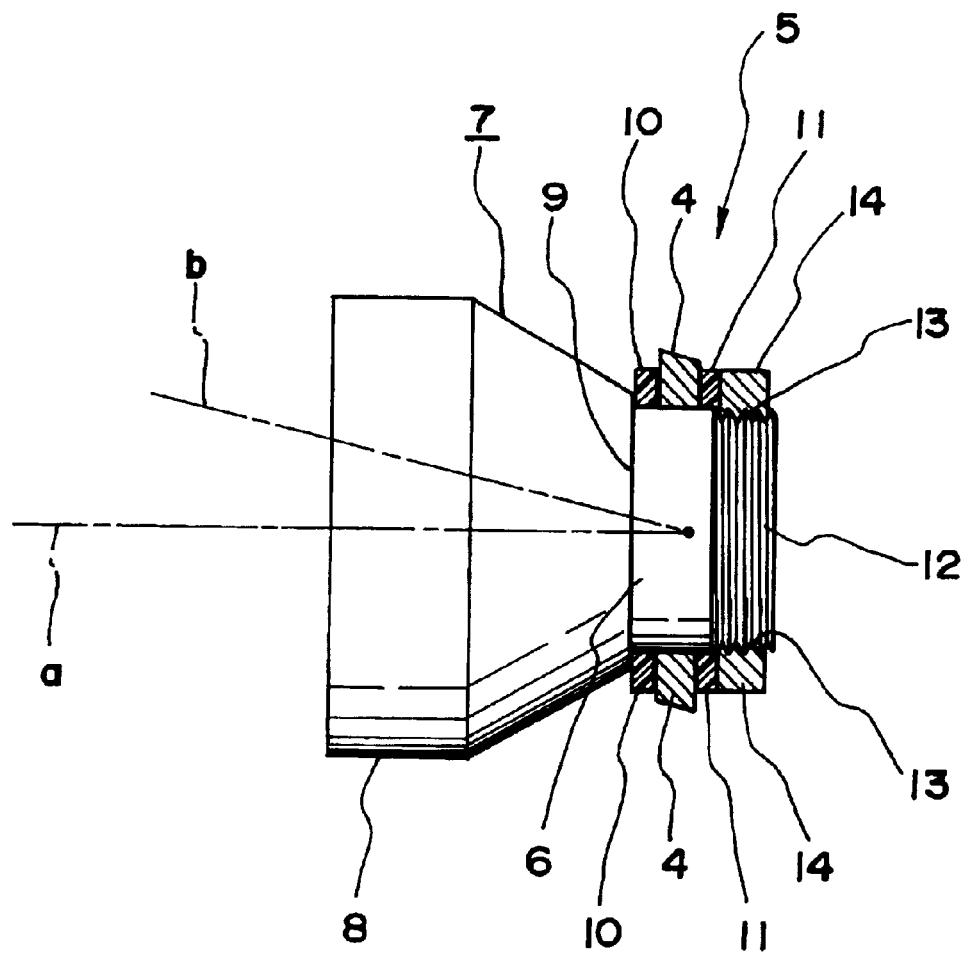
FIG. 3 is a partially enlarged longitudinal sectional view of an essential portion of a magnifying lens.

As shown in FIG. 1 and FIG. 2, magnifying eyewear 2 using eyeglass frames for mounting magnifying lenses (hereinafter simply referred to as "eyeglass frames") comprise a pair of support frames 4 and a pair of magnifying lens main units 7, each of which has an ocular tube 6 removably fixed by a fixing mechanism 5 (to be described later) on the support frames 4. Each of the support frames 4 is integrally molded with each of the main lens frames 3 at the time of manufacture of the eyeglass frames. In order to adjust the fixing position of each magnifying lens main unit 7, the support frame 4 has an oval shape with the longer axis directed in the horizontal direction, and an engagement space is maintained so that the ocular tube 6 engaged with the support frame can be moved horizontally along the inner side of the support frame 4. As shown in FIG. 3, the magnifying lens main unit 7 comprises the ocular tube 6 and an objective tube 8. A magnifying lens system (not shown) having a predetermined focal length is incorporated in the main unit 7, and a graded step 9 is formed on the boundary between the ocular tube 6 and the objective tube 8.

As shown in FIG. 3, each support frame 4 is arranged in such a manner that an optical axis "a" of the magnifying lens system of each magnifying lens main unit 7 is tilted downward at an angle of about 20° with respect to an optical axis "b" of an eyeglass lens (not shown). That is, the support frame 4 is arranged at a position lower than the center of the main lens frame 3, which generally extends along the outer periphery and is curved. Also, the support frame is arranged at a position closer to a bridge between two lens frames 3. It is arranged in such a manner that the optical axis "a" is superimposed on a visual line of a wearer of the eyeglasses, and is directed to a focal point F. In general, the lens frame 3 is tilted downward at an angle of about 10° with respect to a temple 15 (i.e. a portion of the eyeglasses to be put on an ear of the wearer). If the inner sides of upper and lower edges of the support frame 4 are scraped off so that support frame 4 it is tilted at an angle of about 10°, the optical axis "a" can be tilted downward at an angle of about 20° with respect to the optical axis "b". By designing the frame in such a manner, the wearer of the magnifying eyewear 2 can conveniently see downward at any time during a surgical operation.

Figure 4:
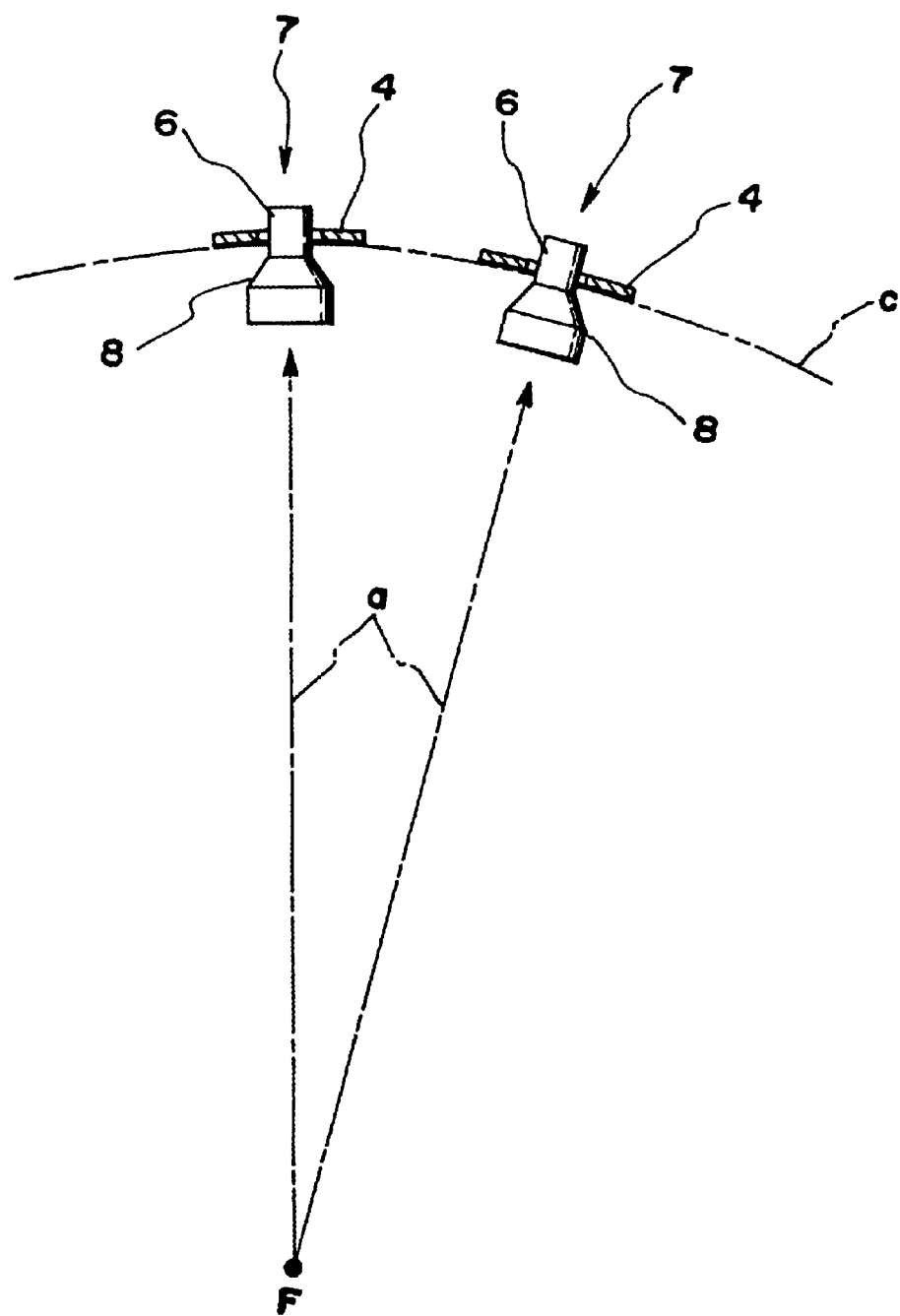
FIG. 4 is a schematical drawing to show the relationship between each of the magnifying lens main units and a focal point of the lens system.

As shown in FIG. 4, upper and lower edges of the support frame 4 must be arranged such that the optical axes "a" of the magnifying lens main units 7 fixed by a fixing mechanism 5 cross each other at the focal point F. The surface of the support frame 4 farthest away from the wearer (hereinafter referred to as "outer surface") is formed as a concave guide surface to match and follow a curve "c" including an arc, which has the focal length as radius.

As shown in FIG. 3, the fixing mechanism 5 comprises an outer spacer 10, an inner spacer 11, and a fixing ring 14. The outer spacer 10 is made of a ring-like plastic soft member and is designed as an outer abutting member. The outer spacer 10 is engaged with a portion of the ocular tube 6 closest to the objective tube 8. One surface of the outer spacer is in contact with the graded step 9, and the other surface abuts the outer surface of the support frame 4. The inner spacer 11 is made of a ring-like plastic soft member, serving as an inner abutting member. It is movably engaged with an end of the ocular tube 6. One surface of the inner spacer 11 is in contact with the inner surface of the support frame 4, and the other surface abuts the fixing ring 14. A female screw (internal thread) 13, to be engaged with a male screw (external thread) 12 provided on the outer periphery of the end of the ocular tube 6, is formed on inner periphery of the fixing ring 14, and the fixing ring 14 serves as a fixing member. By turning the screw to provide deeper engagement, one surface of the outer spacer 10 is pushed against and fixed on the outer surface of the support frame 4, and one surface of the inner spacer 11 is pressed against the inner surface of the support frame 4. As a result, the magnifying lens main unit 7 can be fixed on the support frame 4.

As shown in FIG. 1, on an outer peripheral surface of the support frame 4 (except the upper edge and the outer edge), a lens engagement groove 16 is formed on the inner peripheral surface of the lens frame 3. A lens (not shown) is cut in such a manner that it fits the inner periphery of each lens frame, and also fits the outer periphery of the support frame 4 continuous to the inner periphery. By engaging the outer periphery of the lens with the lens engagement groove 16, the lens can also be used as eyeglasses. No special technique is required for the fabrication of the lens and for the engagement with the lens engagement groove 16, and this procedure can be carried out similarly to the mounting procedure to mount ordinary eyeglass lenses to the lens frames as normally practiced at an optical shop.

With the arrangement as described above, when the fixing ring 14 of the fixing mechanism 5 is turned in a direction to close engagement of the screw and when the support frame 4 is sandwiched between the outer spacer 10 and the inner spacer 11, the magnifying lens main unit 7 is fixed on the support frame 4, and this can be used similarly to the case of ordinary eyeglasses. When the magnifying lens main unit 7 is fixed, it is guided in such manner that the optical axis "a" of the magnifying lens system is directed toward the focal point F by the guide surface. This is because the concave guide surface of the support frame 4 is formed to match and follow the curve "c" including an arc, which has its center at the focal point F of the magnifying lens system, and also because each of the spacers 10 and 11 is made of plastic soft material (see FIG. 3). Further, when the fixing ring 14 of the fixing mechanism 5 is turned in a direction to disengage the screws, the supporting condition via the spacers 10 and 11 is released. By moving the ocular tube 6 within the support frame 4, the magnifying lens main unit 7 can be displaced in a horizontal direction to suit the distance between the two eyes of each individual wearer.

Figure 5:
FIG. 5 is an enlarged side view of another embodiment of an outer ring, which is a member of a fixing mechanism.
Figure 6:
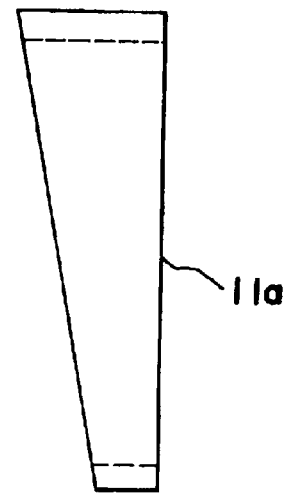
FIG. 6 is an enlarged side view showing another embodiment of an inner ring, which is a member of a fixing mechanism.

Instead of the spacers 10 and 11 made of plastic soft material, an outer abutting ring 10a and an inner abutting ring 11a made of a hard material such as metal as shown in FIG. 5 and FIG. 6 may be used. The outer abutting ring 10a has a convex surface to match the concave guide surface on outer surface of the support frame 4, and the inner abutting ring 11a has a surface to match the inclination of the inner surface of the support frame 4. The material of the spacers 10 and 11 is not limited to plastic material, but rubber may be used as the material.

Figure 7:
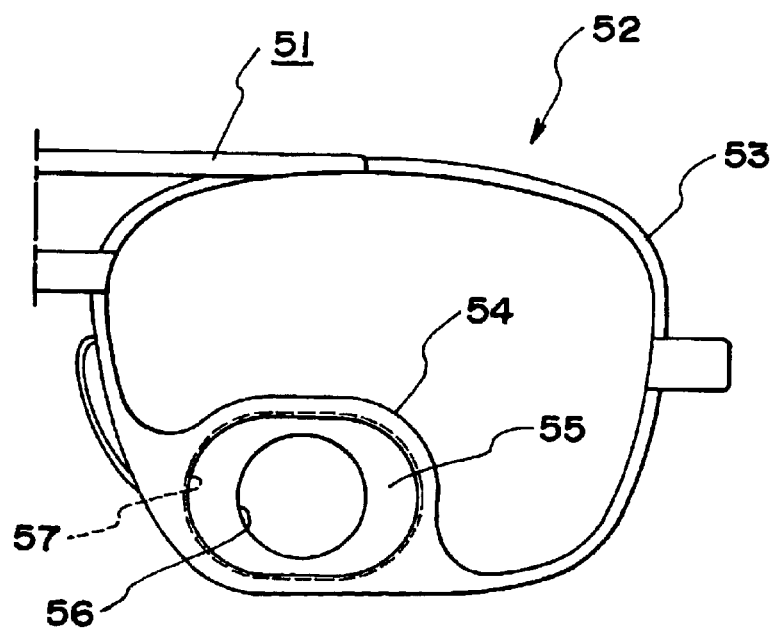
FIG. 7 is a partially enlarged front view of another embodiment of a support unit.

Next, a description will be provided of another embodiment of the present invention referring to FIG. 7. In this embodiment, magnifying eyewear 52 comprises a support frame 54 integrally provided on an inner side of lens frames 53 (only one of them is shown) of eyeglass frames 51. The support frame 54 is arranged at a position lower than the center of the lens frame 53 and closer to the bridge between the lens frames 53. The support frame 54 having a support plate engagement groove 57 in it is arranged on an inner periphery of lens frames 53. An outer edge of a support plate 55, serving as a support member, is engaged and fixed in the support plate engagement groove 57. A magnifying lens main unit (not shown) designed similarly to the magnifying lens main unit 7 of the embodiment already described above is removably fixed in an engagement hole 56, which has an approximately circular shape and is formed through the support plate 55.

Similarly to the case of the support frame 4 of the above embodiment, the support plate 55 may be designed as a concave guide surface. In this case, the optical axes of the magnifying lens systems of the magnifying main unit (not shown) cross each other at the focal point when fixed by the fixing mechanism (not shown). The concave guide surface has an outer surface, which has its center at the focal point of the magnifying lens system, and the concave guide surface matches and follows a curved surface including an arc, which has the focal length as a radius. In this case, it is advantageous that the engagement hole 56 in the support plate 55 has an oval shape with a longer axis directed in the horizontal direction so that the ocular tube (not shown) under engagement can be displaced horizontally along inner and outer surfaces of the support plate 55.

The other arrangement aspects of the magnifying eyewear 52 are the same as those of the embodiment as described above, and a detailed description is not given here.

It is needless to say that the present invention is not limited to any of the above embodiments. For instance, the support frame 4 or the support plate 55 provided with the engagement hole 56 in an oval shape may be designed to have a flat surface so far as the magnifying lens main unit 7 can be guided in the horizontal direction. Also, in addition to the arrangement in that the inner spacer 10 and the outer abutting ring 10a are movably engaged on the ocular tube 6, the magnifying lens may be designed in such a manner that the inner spacer 10 and abutting ring 10a are integrally formed with the ocular tube 6 and only the inner spacer 11 and the inner abutting ring 10b can be moved with respect to the ocular tube 6. Further, the abutting members 10, 10a, 11 and 11a are not limited to ring-like members. An angle of the optical axis "a" directed downward with respect to the optical axis "b" is not limited to 20° and it may be within a range of about 15° to 30°. Also, the eyeglass frames 1 and 51 may not be provided with the temple. In this case, the eyeglass frames 1 can be mounted on an adequate wearing means such as a headband to be attached to the head of the user. Further, a diopter compensation lens may be removably provided on the ocular side in the magnifying lens main unit 7 so that the diopter compensation lens can be changed to suit each individual user.

As described above, the following effects can be attained according to the present invention:

(1) It is easier to mount the magnifying lens main unit on eyeglass frames. Also, no special technique is required for fabrication of the eyeglass lens and for the mounting of the eyeglass lenses to the eyeglass frames. This can be accomplished by an ordinary procedure as generally practiced for ordinary type eyeglass lens at the optical shop. Also, the magnifying glass main unit can be replaced according to each application purpose or to each individual wearer. Further, the eyeglass frames do not need to be manufactured by custom order, and this facilitates the manufacture of the eyeglass frames on a mass production basis and at lower cost.

(2) The magnifying main unit to be mounted in an engagement hole of the support frame or the support plate can be displaced in a horizontal direction. As a result, the distance between the two magnifying lens main units can be adjusted to suit the distance between the two eyes of the user. Further, at least one surface of the support plate or upper and lower edges of the support frame is formed to match and follow the curved surface including an arc, which has the focal length as radius, and to have its center at the focal point of the magnifying lens system within the magnifying lens main unit. As a result, the distance between the two magnifying lens main units can be adjusted to suit the distance between the two eyes of the user while the magnifying lens main unit has its optical axis always directed to the focal point.

(3) When the eyeglass frames and the support plate are manufactured separately and a plurality of support plates with different concave surfaces are prepared, and when these are selected adequately, this facilitates the adjustment of the angle of optical axis of the magnifying lens system of the magnifying lens main unit or the adjustment of the optical axis to each individual user.

(4) The ocular side of the magnifying lens main unit can be positioned closer to the eyes of the wearer. This makes it possible to maintain a wider visual field.

(5) The magnifying lens main unit can be removably fixed on the eyeglass frames by a fixing mechanism, which comprises an outer abutting member, an inner abutting member, and a fixing member. This makes it possible to easily and reliably fix main unit on the eyeglass frames.

What is claimed is:

1. Eyeglass frames for mounting magnifying lenses, comprising:
   a pair of main lens frames for supporting lenses to be mounted therein; and
   a pair of support frames, each of said support frames being arranged inside a respective one of said main lens frames and having an engagement space for receiving a magnifying lens main unit to be removably mounted in said engagement space.

2. The eyeglass frames of claim 1, wherein said engagement space of each of said support frames has a horizontal length larger than a vertical length so that the magnifying lens main unit to be removably mounted therein can be linearly displaced along a horizontal axis of said engagement space.

3. The eyeglass frames of claim 2, wherein at least one of an inner surface closest to a wearer of each of said support frames and an outer surface farthest from the wearer of each of said support frames is shaped to follow the curve of an arc having a center at the focal point of the magnifying lens main units to be removably mounted in said engagement space of each of said support frames, the arc having a radius equal to the focal length of the magnifying lens main units.

4. The eyeglass frames of claim 1, further comprising a pair of magnifying lens main units, each of said magnifying lens main units including a magnifying lens system within a tube and being arranged within said engagement space of a respective one of said support frames so as to be removably mounted to said respective one of said support frames.

5. The eyeglass frames of claim 1, wherein each of said support frames is integrally molded with a respective one of said main lens frames so that each of said support frames and said respective one of said main lens frames has a one-piece construction.

6. The eyeglass frames of claim 1, further comprising a pair of support plates, each of said support plates being mounted to a respective one of said support frames, said engagement space of each of said support frames being formed in said support plate of each of said support frames.

7. The eyeglass frames of claim 6, wherein each of said support frames has an engagement groove formed around an inner periphery thereof, a peripheral portion of each of said support plates engaging, said engagement groove of a respective one of said support frames so as to be mounted to said respective one of said support frames.

8. The eyeglass frames of claim 6, wherein said engagement space of each of said support frames has a horizontal length larger than a vertical length so that the magnifying lens main unit to be removably mounted therein can be linearly displaced along a horizontal axis of said engagement space.

9. The eyeglass frames of claim 8, wherein at least one of an inner surface closest to a wearer of each of said support frames and an outer surface farthest from the wearer of each of said support frames is shaped to follow the curve of an arc having a center at the focal point of the magnifying lens main units to be removably mounted in said engagement space of each of said support frames, the arc having a radius equal to the focal length of the magnifying lens main units.

10. Magnifying eyewear comprising:
    a pair of main lens frames for supporting lenses to be mounted therein;
    a pair of support frames, each of said support frames being arranged inside a respective one of said main lens frames and having an engagement space; and
    a pair of magnifying lens main units arranged to have a predetermined focal length, each of said magnifying lens main units having a magnifying lens system within an ocular tube, and each of said magnifying lens main units being removably mounted in said engagement space of a respective one of said support frames by a respective one of a pair of fixing mechanisms.

11. The magnifying eyewear of claim 10, wherein each of said fixing mechanisms is movably attached to said ocular tube of a respective one of said magnifying lens main units, each of said fixing mechanisms including:

an outer abutting member movably mounted on said ocular tube of said respective one of said magnifying lens main units and arranged to contact an outer surface farthest from a wearer of a respective one of said support frames;

an inner abutting member arranged to contact an inner surface closest to the wearer of said respective one of said support frames; and a fixing ring mounted to said respective one of said magnifying lens main units and operable to press said inner abutting member and said outer abutting member toward each other.

12. The magnifying eyewear of claim 10, further comprising a pair of support plates, each of said support plates being mounted to a respective one of said support frames, said engagement space of each of said support frames being formed in said support plate of each of said support frames.

13. The magnifying eyewear of claim 12, wherein each of said fixing mechanisms is movably attached to said ocular tube of a respective one of said magnifying lens main units, each of said fixing mechanisms including:

an outer abutting member movably mounted on said ocular tube of said respective one of said magnifying lens main units and arranged to contact an outer surface farthest from a wearer of a respective one of said support frames;

an inner abutting member arranged to contact an inner surface closest to the wearer of said respective one of said support frames; and a fixing ring mounted to said respective one of said magnifying lens main units and operable to press said inner abutting member and said outer abutting member toward each other.

14. The magnifying eyewear of claim 10, wherein said engagement space of each of said support frames has a horizontal length larger than a vertical length so that the magnifying lens main unit to be removably mounted therein can be linearly displaced along a horizontal axis of said engagement space.

15. The magnifying eyewear of claim 14, wherein each of said fixing mechanisms is movably attached to said ocular tube of a respective one of said magnifying lens main units, each of said fixing mechanisms including:

an outer abutting member movably mounted on said ocular tube of said respective one of said magnifying lens main units and arranged to contact an outer surface farthest from a wearer of a respective one of said support frames;

an inner abutting member arranged to contact an inner surface closest to the wearer of said respective one of said support frames; and a fixing ring mounted to said respective one of said magnifying lens main units and operable to press said inner abutting member and said outer abutting member toward each other.

16. The magnifying eyewear of claim 14, wherein at least one of an inner surface closest to a wearer of each of said support frames and an outer surface farthest from the wearer of each of said support frames is shaped to follow the curve of an arc having a center at the focal point of the magnifying lens main units to be removably mounted in said engagement space of each of said support frames, the arc having a radius equal to the predetermined focal length of the magnifying lens main units.

17. The magnifying eyewear of claim 16, wherein each of said fixing mechanisms is movably attached to said ocular tube of a respective one of said magnifying lens main units, each of said fixing mechanisms including:

an outer abutting member movably mounted on said ocular tube of said respective one of said magnifying lens main units and arranged to contact said outer surface of a respective one of said support frames;

an inner abutting member arranged to contact said inner surface of said respective one of said support frames; and a fixing ring mounted to said respective one of said magnifying lens main units and operable to press said inner abutting member and said outer abutting member toward each other.

18. The magnifying eyewear of claim 10, wherein each of said support frames is integrally molded with a respective one of said main lens frames so that each of said support frames and said respective one of said main lens frames has a one-piece construction.

19. The magnifying eyewear of claim 10, further comprising a pair of lenses, each of said lenses being mounted to a respective one of said main lens frames.

* * * * *